United States Patent
Bober et al.

(10) Patent No.: US 9,291,488 B2
(45) Date of Patent: Mar. 22, 2016

(54) MEASUREMENT DEVICE BASED ON ACOUSTIC FLOW MEASUREMENT METHODS IN A PUMP SYSTEM AND METHOD FOR PRODUCING A MEASUREMENT DEVICE

(71) Applicant: em-tec GmbH, Finning (DE)

(72) Inventors: Maciej Bober, Utting am Ammersee (DE); Stefan Esterl, Groebenzell (DE); Bernward Reszel, Riederau (DE)

(73) Assignee: em-tec GmbH, Finning (DE)

( * ) Notice: Subject to any disclaimer, the term of this patent is extended or adjusted under 35 U.S.C. 154(b) by 107 days.

(21) Appl. No.: 14/030,517

(22) Filed: Sep. 18, 2013

(65) Prior Publication Data

US 2014/0076062 A1    Mar. 20, 2014

(30) Foreign Application Priority Data

Sep. 20, 2012   (DE) .................. 10 2012 018 572
Apr. 22, 2013   (DE) .................. 10 2013 006 825

(51) Int. Cl.
*G01F 1/66*    (2006.01)

(52) U.S. Cl.
CPC *G01F 1/66* (2013.01); *G01F 1/662* (2013.01); *Y10T 29/49005* (2015.01)

(58) Field of Classification Search
None
See application file for complete search history.

(56) References Cited

U.S. PATENT DOCUMENTS

| | | | | |
|---|---|---|---|---|
| 2,984,756 | A * | 5/1961 | Bradfield | 310/327 |
| 3,973,152 | A * | 8/1976 | Karplus | 310/327 |
| 4,297,607 | A * | 10/1981 | Lynnworth et al. | 310/334 |
| 4,313,070 | A * | 1/1982 | Fisher | 310/313 R |
| 4,338,820 | A * | 7/1982 | Jassby et al. | 73/597 |
| 4,373,401 | A * | 2/1983 | Baumoel | 73/861.18 |
| 4,509,360 | A * | 4/1985 | Erwin et al. | 73/61.75 |
| 5,159,838 | A * | 11/1992 | Lynnworth | 73/644 |
| 6,895,815 | B2 * | 5/2005 | Adgie et al. | 73/290 V |
| 8,047,081 | B2 | 11/2011 | Berberig et al. | |
| 8,978,476 | B2 * | 3/2015 | Ao et al. | 73/617 |
| 2004/0113522 | A1 | 6/2004 | Nagahara et al. | |
| 2005/0154307 | A1 * | 7/2005 | Hirayama et al. | 600/453 |
| 2006/0052963 | A1 | 3/2006 | Shkarlet | |
| 2007/0131034 | A1 * | 6/2007 | Ehlert et al. | 73/617 |
| 2009/0143673 | A1 | 6/2009 | Drost et al. | |
| 2011/0023623 | A1 * | 2/2011 | Berberig et al. | 73/861.25 |
| 2012/0137788 | A1 | 6/2012 | Haefliger et al. | |

FOREIGN PATENT DOCUMENTS

| | | |
|---|---|---|
| DE | 39 11 408 A1 | 10/1990 |
| DE | 10 2006 012 114 A1 | 9/2007 |
| DE | 10 2008 039 464 A1 | 3/2010 |
| EP | 2 461 079 A1 | 6/2012 |

OTHER PUBLICATIONS

German Search Report dated Jul. 31, 2013 in German Application No. 10 2013 006 825.8 with English translation of the relevant parts.

* cited by examiner

*Primary Examiner* — Harshad R Patel
(74) *Attorney, Agent, or Firm* — Collard & Roe, P.C.

(57) ABSTRACT

A measurement device determines a volume flow based on acoustic flow measurement methods in a pump system and a method produces the measurement device. The measurement device includes a measurement path with two coupling wedges with two sound transducers disposed on the coupling wedges. The pump system and the coupling wedges are made of metal or a metal alloy.

17 Claims, 3 Drawing Sheets

MEASUREMENT DEVICE BASED ON ACOUSTIC FLOW MEASUREMENT METHODS IN A PUMP SYSTEM AND METHOD FOR PRODUCING A MEASUREMENT DEVICE

CROSS REFERENCE TO RELATED APPLICATIONS

Applicant claims priority under 35 U.S.C. §119 of German Application No. 10 2012 018 572.3 filed Sep. 20, 2012 and German Application No. 10 2013 006 825.8 filed Apr. 22, 2013, the disclosures of which are incorporated by reference.

BACKGROUND OF THE INVENTION

1. Field of the Invention

The invention relates to a measurement device for determining a volume flow based on acoustic flow measurement methods in a pump system and a method for producing a measurement device for determining the volume flow based on acoustic flow methods in a pump system.

2. Description of the Related Art

Flow measurement methods based on the entrainment effect for determining a through-flow are known from the literature and from a plurality of products.

SUMMARY OF THE INVENTION

The problem of the present invention is to improve the latter.

This problem is solved by a measurement device for determining a volume flow based on acoustic flow measurement methods in a pump system, wherein the measurement device comprises a measurement path with two coupling wedges with two sound transducers disposed on the latter, characterised in that the pump system and the coupling wedges are made of metal or a metal alloy.

The pump system can be a pump system in the medical field. In particular, implantable pump systems should also be included. A measurement device in a pump system is understood to mean a measurement device at an arbitrary point in the pump system. The measurement device can for example be coupled to an inlet, an outlet or to the pump housing itself. The pump system also includes the pipe system connected to a pump.

Acoustic flow measurement methods enable the determination of the through-flow of liquids by means of an analysis of the acoustic wave modulated by the flow. With a sensor unit disposed as a pair, comprising sound transducers acting alternately as transmitter and receiver, the relative propagation time differences (in and against and the flow direction), the beam deflection (path displacement) and changes in phase, amplitude and frequency of the acoustic wave can in principle be evaluated. Scattering effects can also be evaluated. Effects of, for example, the Doppler effect or entrainment effect can thus be determined. The relative propagation time difference is preferably evaluated in the present application.

In order to obtain a measurement effect and to receive the transmitted sound waves, the sound transducers must be fitted in a specific angle range with respect to the flow. This takes place by assembly on so-called coupling wedges. The coupling wedges can be fitted at different points in a pipe system. Irrespective of the location of the fitting, the coupling wedges are fixedly connected to the pipe system. This is preferably achieved by corresponding recesses milled out of the pipe wall. A variant is the gluing or welding of coupling wedges to the desired measurement point.

It is advantageous if the pump system is a blood pump system. It is desirable particularly in blood pump systems to be able to determine the volume flow without thereby intervening invasively into the liquid flow. It is particularly advantageous if the sound transducers are not in contact with the blood flow.

The coupling wedges can be fitted to the pump inlet, pump outlet or pump housing irrespective of the design. Irrespective of the location of the fitting, the coupling wedges are connected fixedly to the pump. This is preferably achieved by suitable recesses milled out of the housing or inlet or outlet. Arrangement in the associated pipe system is also possible here.

In the case of a blood pump system, the liquid to be measured is blood. When the pump system is a blood pump system, the latter is used to assist or replace the human heart. The measurement system then meets the requirements for fully implantable medical products.

The pump system and the coupling wedges are advantageously made of titanium or a titanium alloy. Titanium is used as a biomaterial for implantable pump systems, in particular blood pumps, on account of its resistance to corrosion compared to other metals.

A measurement path comprises two coupling wedges with in each case a sound transducer which acts alternately as a transmitter and a receiver. At least one measurement path is necessary. It is advantageous if the measurement device comprises a plurality of measurement paths. The measurement accuracy can thus be increased. Insofar as it is possible in terms of design, this can be as large a number of measurement paths as possible. The number of measurement paths is however limited by the available space. The given embodiments of the coupling wedges (angle, spacing, height) can be identical or different.

A measurement path can be disposed in a radial direction and/or in an axial direction and/or in a diagonal direction.

The arrangement of the individual measurement paths is governed, apart from by the geometrical limitations of the given pump, according to the form and speed of the flow to be expected at the measurement point. One or more measurement paths in a radial direction are preferably provided in the case of a radially directed main flow, the arrangement preferably taking place axially in the case of an axial flow. Since a complex flow form is always present in the case of rotation pumps (axial flow with superimposed rotation, separation regions with corresponding eddy formation and recirculation), a preferred embodiment of the invention is the combination of differently provided measurement paths, this also including a diagonal arrangement of the measurement paths. It is desirable to position the measurement point on the vectorially largest component of the flow rate, because the physical measurement effect is at a maximum at this point. The "search" for an optimum measurement point is assisted by flow measurements, flow simulations, theoretical considerations and tests.

In the sense of a high measurement effect, a measurement path is preferably created either at the highest flow rate to be expected in the pump or at a point at which the sound can cover the maximum possible path. The influence of interferences is thus also minimised.

The coupling wedges can have a wedge spacing of 0 mm to 20 mm.

The spacing between the two coupling wedges of a measurement path is established by the available sound path and the number of desired reflections. There is no fixed minimum or maximum spacing, the pump size and the compromise between measurement effect and reception quality to be verified experimentally being limiting factors.

The measurement can take place both by reflection, by transmission or by a combination of the two. Technically, neither of the two solutions is to be preferred, the embodiment depending purely on the geometrical circumstances. All the solutions have hitherto been carried out reflectively. The opposite side of the housing, of the inlet or the outlet connection piece can be used as a reflector. The reflector surface can be constituted flat, concave or convex.

The spacing and angle of the coupling wedges is to be established depending on the design and size of the pump, in particular also the diameter of the measurement channel. The magnitudes denoted in the following illustration should preferably be complied with. The corresponding geometrical definitions can be found in FIG. 1 and the following description relating thereto.

A wedge spacing between 0 mm and 20 mm should preferably be complied with. The minimum spacing of 0 mm means that the wedges must not run "into one another", in order to avoid direct crosstalk from wedge to wedge. A minimum spacing of 1 mm to 2 mm is preferably provided in order to provide further measures for the acoustic decoupling. A large spacing, such as for example 20 mm, is advantageous for permitting multiple reflections and thus for increasing the measurement effect. Larger spacings can also be provided, but a signal loss is to be expected and the pumps are usually not so large.

It is advantageous if the coupling wedges form a wedge angle between 20° and 70° and a right angle at the coupling wedge tip.

The angle of the coupling wedges should be constituted such that, as far as possible, no total reflection occurs after the reflection of the sound wave at the transition from the acoustically thinner medium (water or blood) into the acoustically thicker medium (metal). For example, according to the law of refraction and the realistic assumption of a speed of sound of 6000 m/s in titanium and 1580 m/s in the liquid, an angle of incidence of the sound from (metal) titanium into water (blood) of less than 15.3° results. According to the law of refraction, total reflection can be avoided with each wedge angle between 0° and 90°. An embodiment with a right angle at the designated point is preferable from the design standpoint, in order if possible to couple in all the sound beams running in parallel, and a wedge angle between 20° and 70°. Primarily in order that the wedges are not allowed to become too high or too wide on account of the condition of the right angle.

It is advantageous if the coupling wedges comprise a concave milled-out recess on a support surface for the sound transducer.

In the simplest embodiment, the coupling wedges have a plane support surface for the sound transducers. The support surface can also have a concave milled-out recess in variants. After filling with suitable plastic, this permits the formation of an acoustic lens for focusing the sound. The plastic can be an adhesive material, which is used to connect the sound transducers to the coupling wedges.

It is also advantageous if the acoustic flow measurement can be carried out on metal, in particular titanium, in such a way that the crosstalk from transmitter to receiver can for the most part be eliminated via the metal. In the ideal case, it will be sought to receive only the signal which has migrated through the flow; at the least it will be sought to separate it cleanly from the stray waves. To achieve this, there are a number of possibilities which can be employed alternatively or cumulatively.

A wall thickness in a region between two coupling wedges can be reduced compared to the wall thickness in a region outside the two coupling wedges.

Furthermore, a groove can be milled alternatively or cumulatively into a wall between two coupling wedges.

Finally, a damping medium can also be disposed alternatively or cumulatively between two coupling wedges. The damping medium can be provided on and between the coupling wedges. The damping medium should have similar acoustic properties to titanium, i.e. a similar acoustic impedance (product of density times the speed of sound), in order to achieve a good coupling from the titanium into the medium. At the same time, it should have high damping properties in order to attenuate the decoupled sound. An epoxy resin with tungsten and/or aluminium components can be used here as the material. A combination of all three measures is particularly advantageous.

The sound transducers can be both composite ceramics known from the literature as well as conventional piezoceramic elements, for example of lead, zirconium, titanate (FZT), in a differing embodiment.

The piezoceramic elements are advantageously disposed as a phased array. The design of phased-array sound transducers is known from the literature.

The sound transducers can transmit a sound wave in the frequency range of ultrasound, preferably in the range between 2 MHz to 8 MHz.

One or more "matching layers" sufficiently well known from the literature in the thickness of Lambda/4 are provided at the front side of the sound transducer for the purpose of electrical insulation and acoustic coupling. This is very advantageous for compensating for the impedance differences between ceramic and metal.

A "backing" sufficiently well known from the literature should be applied to the rear side of the ceramic. The latter should preferably have the same acoustic impedance as the employed sound transducer and have high damping properties. This embodiment is preferred, because broad-band short sound pulses clearly separated from one another in time are thus obtained.

It is advantageous if the sound transducers are electrically insulated with respect to the coupling wedges. If the metal is a conductive metal such as titanium, both an electrical insulation of the sound transducers and at the same time an acoustically conductive fixing to the coupling wedges are advantageous.

For this purpose, the insulation can be made from a non-conductive adhesive or epoxy resin layer. It is advantageous if the layer thickness does not fall below a certain minimum thickness, such that an electrical contact arises due to the surface roughness of the titanium and/or the sound transducers. This can be achieved, in particular, with a thickness of 10 µm to 200 µm, preferably with a thickness of 100 µm. It is also advantageous if the layer thickness of the insulating material amounts to less than a wavelength, preferably Lambda/4 of the resultant wavelength in the material.

The non-conductive adhesive or epoxy resin layer can advantageously comprise insulating particles with a diameter of 10 µm to 200 µm, preferably of 100 µm. The mixing-in of these insulating particles with a defined diameter ensures that the layer thickness does not fall below the desired minimum thickness, so that an electrical contact does not arise despite the surface roughness of the titanium and/or the sound transducer.

The adhesive or epoxy resin layer can comprise a plurality of adhesive layers, wherein a layer thickness of 10 µm to 200 µm, preferably of 100 µm, is ensured. Here too, the application of a plurality of the adhesive layers behind one another ensures that the layer thickness does not fall below a certain minimum thickness, so that an electrical contact does not arise despite the surface roughness of the titanium and/or the sound transducer.

It is also advantageous if the sound transducer is coated over the whole area with insulating material on the contact side, wherein the layer thickness of the insulating material amounts to less than a wavelength, preferably Lambda/4 of the resultant wavelength in the material.

Spacers can also be disposed between sound transducer and coupling wedge, in particular with a thickness of 10 µm to 200 µm, preferably of 100 µm. The hollow space thus arising between the coupling wedge and the sound transducer can be filled with adhesive or resin.

BRIEF DESCRIPTION OF THE DRAWINGS

The invention is explained below in greater detail with the aid of examples of embodiment making reference to the drawings. In the figures.

DETAILED DESCRIPTION OF PREFERRED EMBODIMENTS

Figure 1:
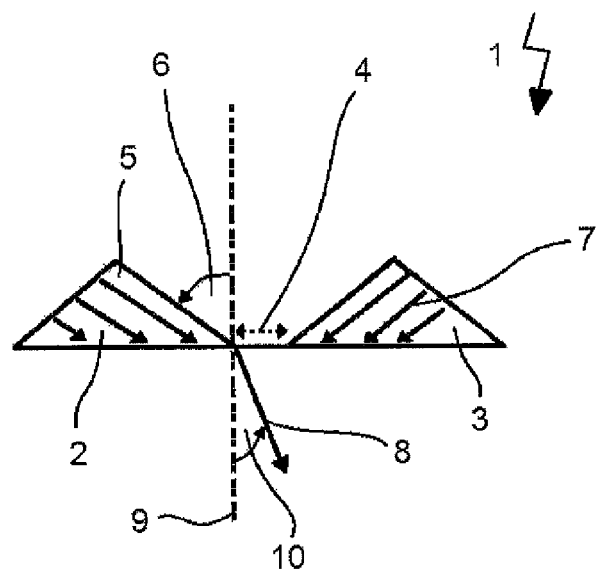
FIG. 1 shows a diagrammatic representation of a measurement device containing the denoted magnitudes.

The relevant denoted magnitudes will be introduced with the aid of the diagrammatic representation of a measurement device 1. A measurement path of measurement device 1 comprises coupling wedges 2, 3. The latter are disposed with a wedge spacing marked by arrow 4. Each of coupling wedges 2, 3 comprises a right angle 5 in the wedge tip. Wedge angle 6 defines the other two angles of the coupling wedge. The sound path is represented with the aid of the diagrammatically represented sound beams as, for example, 7 or 8. Here, the angle between sound beam 8 and the vertical 9 is the angle of incidence 10 of titanium in liquid.

Figure 2:
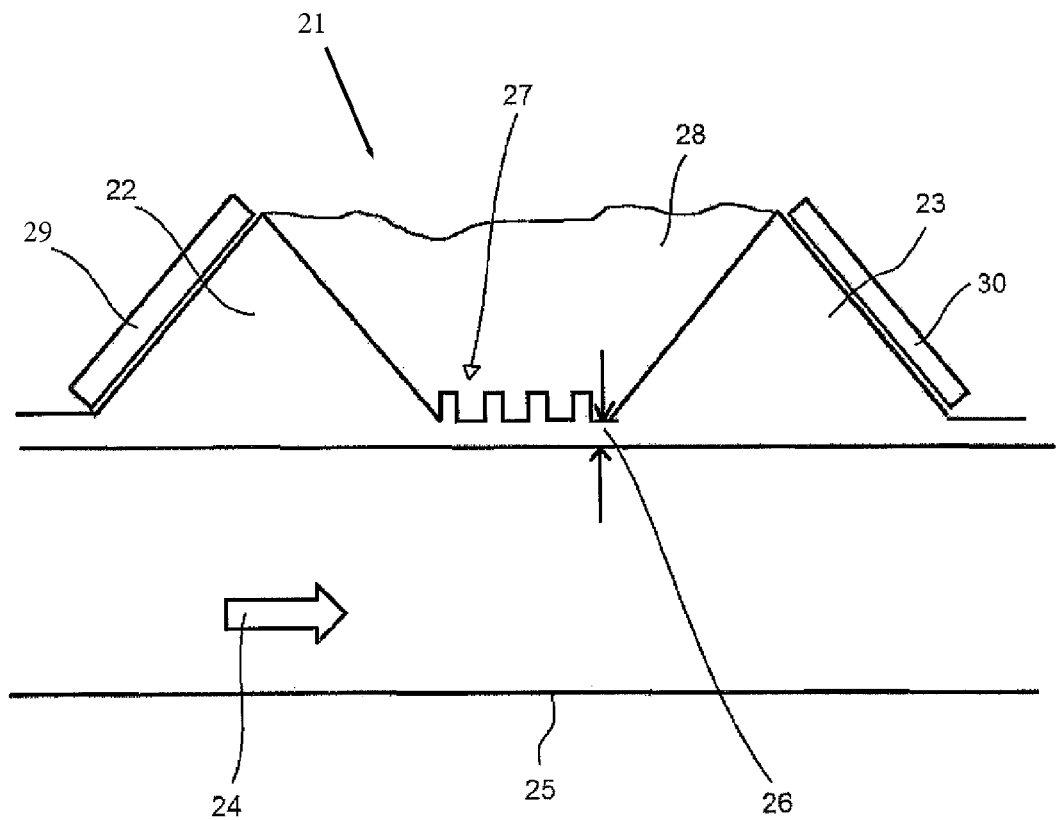
FIG. 2 shows a diagrammatic representation of a measurement device with measures for reducing the crosstalk from transmitter to receiver and FIGS. 3a to 3d show various design variants for the connection of sound transducer and coupling wedge.

A measurement path is also represented in measurement device 21 in FIG. 2. With the aid of this measurement path, comprising coupling wedges 22, 23, flow 24 of the medium is determined with the aid of reflections at reflector 25, which for example can be a side of a pipe lying opposite, a side of a housing lying opposite or a surface of built-in components. In order to keep the crosstalk from transmitter to receiver via the metal of the pipe wall or housing wall as small as possible between coupling wedges 22, 23, a wall thickness 26 as small as possible was selected between coupling wedges 22, 23. In addition, grooves 27 were milled in and the spacing between the coupling wedges was filled by a damping medium 28. A transmission of the sound waves from sound transducer 29 via coupling wedge 22 to sound transducer 30 via coupling wedge 23 thus takes place almost completely via the medium present in flow 24.

Figure 3A:
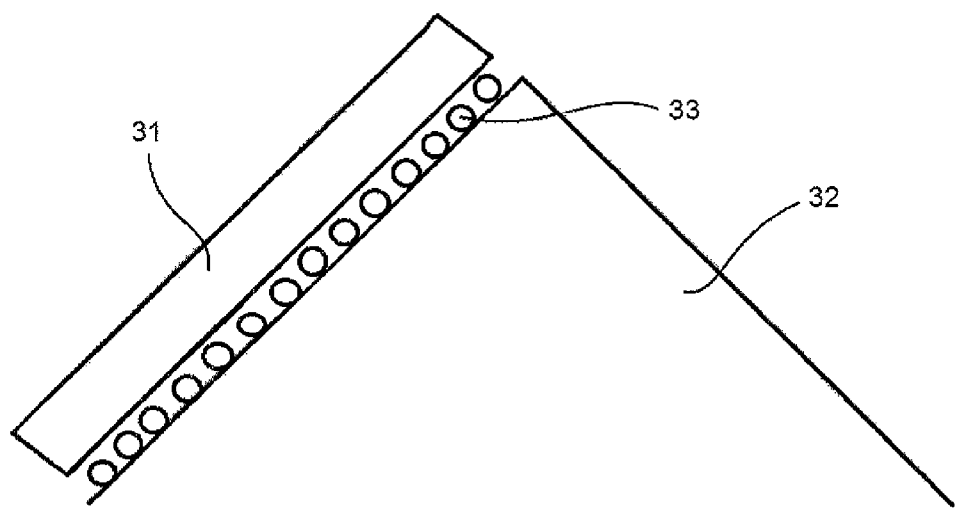
Figure 3B:
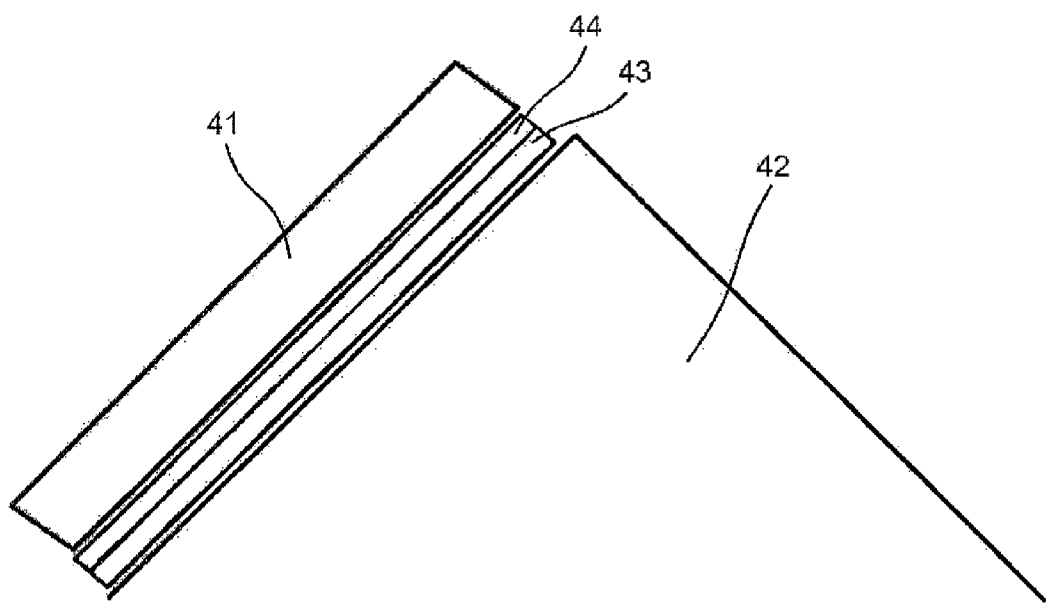
Figure 3C:
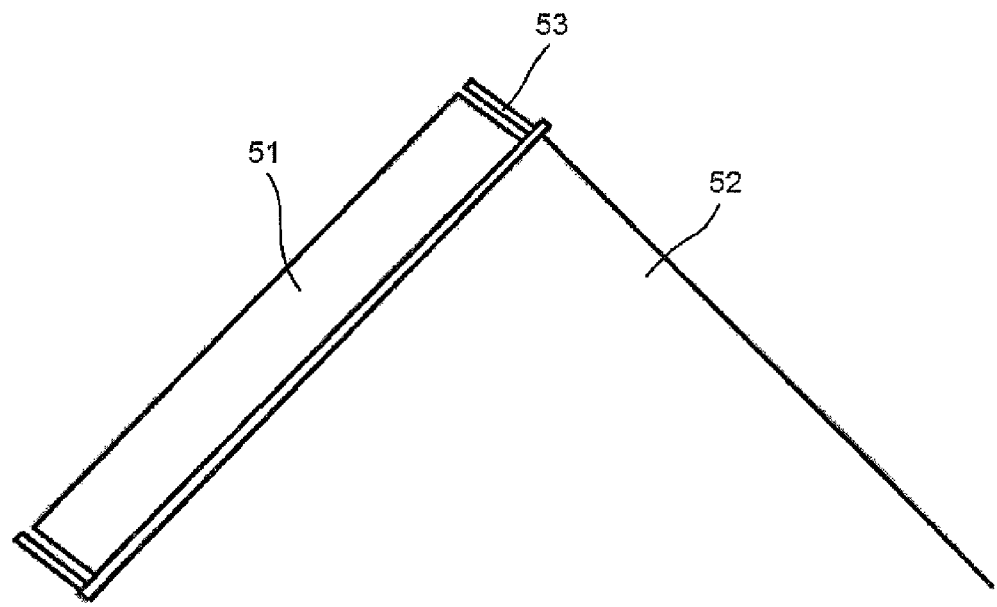
Figure 3D:
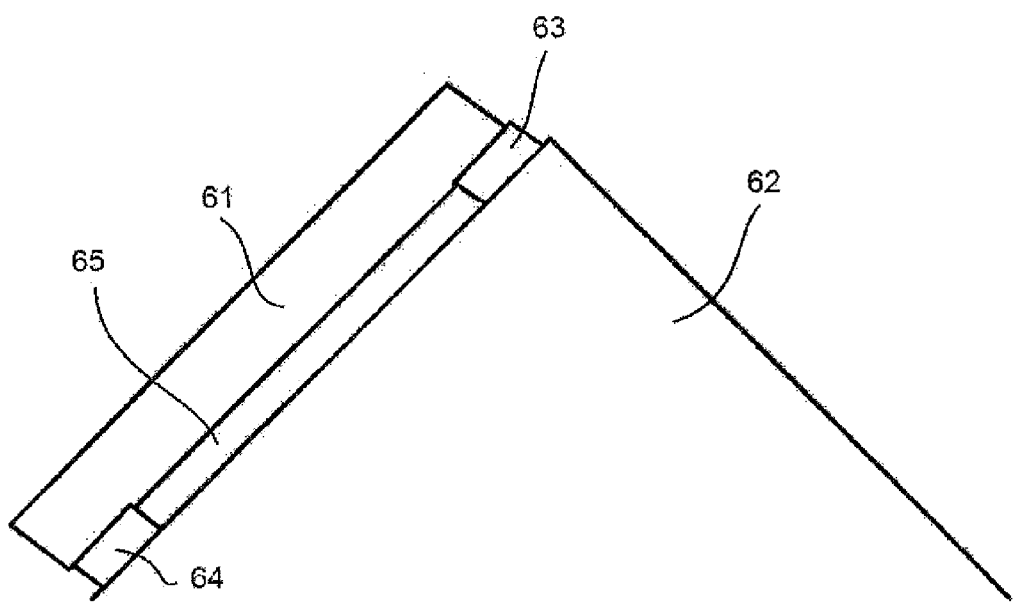

The connection of a sound transducer 31 to a coupling wedge 32 can take place by means of an adhesive layer with insulating particles 33 (FIG. 3a). Alternatively, the connection of sound transducer 41 to coupling wedge 42 can take place via a plurality of adhesive layers such as adhesive layers 43, 44 (FIG. 3b). Furthermore, it is possible to envelop sound transducer 51 with an insulation 53 and only then to connect it to coupling wedge 52 (FIG. 3c). Furthermore, it is possible to connect sound transducer 61 via spacers 63, 64 to coupling wedge 62 and to fill intermediate space 65 thus arising with adhesive or resin. With all these design variants, which can be used alternatively or cumulatively, the sound transducer is fitted to the coupling wedges electrically insulated and at the same time acoustically conducting. The layer thickness does not fall below the surface roughness of titanium and/or the sound transducer, in order to avoid an electrical contact. This can be achieved, in particular, with a thickness from 10 µm to 200 µm, in particular of 100 µm. It is advantageous if the layer thickness of the insulating material amounts to less than a wavelength, preferably Lambda/4, of the resultant wavelength in the material.

What is claimed is:

1. A measurement device for determining a volume flow based on acoustic flow measurement methods in a pump system, the measurement device comprising:
    a first acoustic measurement path with first and second coupling wedges with a first sound transducer disposed on the first coupling wedge and with a second sound transducer disposed on the second coupling wedge, the first acoustic measurement path being disposed in a radial direction or in an axial direction or in a diagonal direction,
    wherein the pump system and the coupling wedges are made of metal or a metal alloy,
    wherein the first and second coupling wedges are milled out from a housing or from an inlet or an outlet,
    wherein a wall thickness in a region between the first coupling wedge and the second coupling wedge is reduced compared to a wall thickness in a region outside the first coupling wedge and the second coupling wedge, and
    wherein a groove is milled into a wall between the first coupling wedge and the second coupling wedge.

2. The measurement device according to claim 1, wherein the pump system is a blood pump system.

3. The measurement device according to claim 1, wherein the pump system and the first and second coupling wedges are made of titanium or a titanium alloy.

4. The measurement device according to claim 1, wherein the first and second coupling wedges have a wedge spacing from 0 to 20 mm.

5. The measurement device according to claim 1, wherein the first and second coupling wedges form a wedge angle between 20° and 70° and a right angle at the coupling wedge tip.

6. The measurement device according to claim 5, wherein the first sound transducer has a triangular shape.

7. The measurement device according to claim 1, wherein the first and second coupling wedges comprise a concave milled-out recess on a support surface for the sound transducer.

8. The measurement device according to claim 1, wherein a damping medium is disposed between the first and second coupling wedges.

9. The measurement device according to claim 1, wherein the first and second sound transducers are piezoceramic elements.

10. The measurement device according to claim 9, wherein the piezoceramic elements are disposed as a phased array.

11. The measurement device according to claim 10, wherein the non-conductive adhesive or epoxy resin layer comprises insulating particles with a diameter of 10 μm to 200 μm.

12. The measurement device according to claim 10, wherein the non-conductive adhesive or epoxy resin layer comprises a plurality of adhesive layers and has a layer thickness of 10 μm to 200 μm.

13. The measurement device according to claim 9, wherein the insulation comprises a non-conductive adhesive or epoxy resin layer.

14. The measurement device according to claim 9, wherein the first sound transducer is coated over the whole area with insulating material on the contact side, and wherein the layer thickness of the insulating material amounts to less than a wavelength of the resultant wavelength in the material.

15. The measurement device according to claim 9, wherein spacers are disposed between the first sound transducer and the first coupling wedge.

16. The measurement device according to claim 1, wherein the first and second sound transducers are electrically insulated with respect to the first and second coupling wedges.

17. A method for producing the measurement device for determining a volume flow based on acoustic flow measurement methods in a pump system, wherein the measurement device comprises:

a first acoustic measurement path with a first coupling wedge and a second coupling wedge with a first sound transducer disposed on the first coupling wedge and with a second sound transducer disposed on the second coupling wedge, the first acoustic measurement path being disposed in a radial direction or in an axial direction or in a diagonal direction, the pump system and the first and second coupling wedges being made of metal or a metal alloy, wherein the method comprises steps of:

milling out the first and second coupling wedges from a housing or from an inlet or an outlet;

disposing the first sound transducer on the first coupling wedge and the second sound transducer on the second coupling wedge;

reducing a wall thickness in a region between the first coupling wedge and the second coupling wedge compared to a wall thickness in a region outside the first coupling wedge and the second coupling wedge; and milling a groove into a wall between the first coupling wedge and the second coupling wedge.

* * * * *